(12) United States Patent
Shiftan et al.

(10) Patent No.: US 7,725,369 B2
(45) Date of Patent: May 25, 2010

(54) METHOD AND SERVER FOR MANAGEMENT OF ELECTRONIC RECEIPTS

(75) Inventors: Nicholas Shiftan, La Jolla, CA (US); Patrick Gauthier, Mountain View, CA (US); Julie Lins, Belmont, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 0 days.

(21) Appl. No.: 12/359,251

(22) Filed: Jan. 23, 2009

(65) Prior Publication Data

US 2009/0164344 A1    Jun. 25, 2009

Related U.S. Application Data

(63) Continuation of application No. 10/676,508, filed on Sep. 30, 2003.

(60) Provisional application No. 60/467,710, filed on May 2, 2003.

(51) Int. Cl.
   *G06Q 10/00* (2006.01)
   *G07G 1/12* (2006.01)
   *G07G 5/00* (2006.01)

(52) U.S. Cl. .......................... 705/28; 705/24

(58) Field of Classification Search ............. 705/28
   See application file for complete search history.

(56) References Cited

U.S. PATENT DOCUMENTS

| 3,935,933 A | 2/1976 | Tanaka et al. |
| 4,011,433 A | 3/1977 | Tateisi et al. |
| 4,108,350 A | 8/1978 | Forbes, Jr. |
| 4,124,109 A | 11/1978 | Bissell et al. |
| 4,195,864 A | 4/1980 | Morton et al. |

(Continued)

FOREIGN PATENT DOCUMENTS

AU    200039412 A1    12/2000

(Continued)

OTHER PUBLICATIONS

Commerce unplugged: Canadian Grocer: Toronto, Jun. 2001. vol. 115, Issue 5, p. 38.*

(Continued)

*Primary Examiner*—Matthew S Gart
*Assistant Examiner*—Harshad Parikh
(74) *Attorney, Agent, or Firm*—Townsend and Townsend and Crew LLP

(57) ABSTRACT

A system for managing electronic receipts is provided. According to one aspect, the system includes a portable device, a base device, a user device and an electronic receipts administration system. The electronic receipts administration system provides the base device with the appropriate data to allow the base device to generate, store and manage electronic receipts accordingly. A user uses the portable device to conduct a transaction with the base device. The base device uses a variety of information to generate an electronic receipt for the transaction. Such information includes, for example, information stored on the portable device, information stored locally on the base device and information stored on another device such as an electronic cash register. The electronic receipt is then stored on the portable device. The user device allows the user to subsequently retrieve the electronic receipt for management purposes.

19 Claims, 1 Drawing Sheet

U.S. PATENT DOCUMENTS

| | | |
|---|---|---|
| 4,412,631 A | 11/1983 | Haker |
| 4,544,590 A | 10/1985 | Egan |
| 4,568,403 A | 2/1986 | Egan |
| 4,674,041 A | 6/1987 | Lemon et al. |
| 4,723,212 A | 2/1988 | Mindrum et al. |
| 4,742,215 A | 5/1988 | Daughters et al. |
| 4,794,530 A | 12/1988 | Yukiura et al. |
| 4,825,053 A | 4/1989 | Caille |
| 4,837,422 A | 6/1989 | Dethloff et al. |
| 4,841,712 A | 6/1989 | Roou |
| 4,868,376 A | 9/1989 | Lessin et al. |
| 4,882,675 A | 11/1989 | Nichtberger et al. |
| 4,910,672 A | 3/1990 | Off et al. |
| 4,930,129 A | 5/1990 | Takahira |
| 4,941,090 A | 7/1990 | McCarthy |
| 4,949,256 A | 8/1990 | Humble |
| 4,954,003 A | 9/1990 | Shea |
| 4,985,615 A | 1/1991 | Iijima |
| 4,992,940 A | 2/1991 | Dworkin |
| 5,019,452 A | 5/1991 | Watanabe et al. |
| 5,019,695 A | 5/1991 | Itako |
| 5,025,372 A | 6/1991 | Burton et al. |
| 5,056,019 A | 10/1991 | Schultz et al. |
| 5,060,793 A | 10/1991 | Hyun et al. |
| 5,060,804 A | 10/1991 | Beales et al. |
| 5,063,596 A | 11/1991 | Dyke |
| 5,115,888 A | 5/1992 | Schneider |
| 5,117,355 A | 5/1992 | McCarthy |
| 5,128,752 A | 7/1992 | Von Kohorn |
| 5,161,256 A | 11/1992 | Iijima |
| 5,173,851 A | 12/1992 | Off et al. |
| 5,185,695 A | 2/1993 | Pruchnicki |
| 5,200,889 A | 4/1993 | Mori |
| 5,202,826 A | 4/1993 | McCarthy |
| 5,227,874 A | 7/1993 | Von Kohorn |
| 5,256,863 A | 10/1993 | Ferguson et al. |
| 5,285,278 A | 2/1994 | Holman |
| 5,287,181 A | 2/1994 | Holman |
| 5,287,268 A | 2/1994 | McCarthy |
| 5,299,834 A | 4/1994 | Kraige |
| 5,308,120 A | 5/1994 | Thompson |
| 5,353,218 A | 10/1994 | De Lapa et al. |
| 5,380,991 A | 1/1995 | Valencia et al. |
| RE34,915 E | 4/1995 | Nichtberger et al. |
| 5,402,549 A | 4/1995 | Forrest |
| 5,417,458 A | 5/1995 | Best et al. |
| 5,420,606 A | 5/1995 | Begum et al. |
| 5,450,938 A | 9/1995 | Rademacher |
| 5,466,010 A | 11/1995 | Spooner |
| 5,471,669 A | 11/1995 | Lidman |
| 5,473,690 A | 12/1995 | Grimonprez et al. |
| 5,483,444 A | 1/1996 | Heintzeman et al. |
| 5,484,998 A | 1/1996 | Bejnar et al. |
| 5,491,326 A | 2/1996 | Marceau et al. |
| 5,491,838 A | 2/1996 | Takahisa et al. |
| 5,500,681 A | 3/1996 | Jones |
| 5,501,491 A | 3/1996 | Thompson |
| 5,513,102 A | 4/1996 | Auriemma |
| 5,515,270 A | 5/1996 | Weinblatt |
| 5,530,232 A | 6/1996 | Taylor |
| 5,531,482 A | 7/1996 | Blank |
| 5,535,118 A | 7/1996 | Chumbley |
| 5,537,314 A | 7/1996 | Kanter |
| 5,559,313 A | 9/1996 | Claus et al. |
| 5,564,073 A | 10/1996 | Takahisa |
| 5,577,266 A | 11/1996 | Takahisa et al. |
| 5,577,915 A | 11/1996 | Feldman |
| 5,578,808 A | 11/1996 | Taylor |
| 5,579,537 A | 11/1996 | Takahisa |
| 5,590,038 A | 12/1996 | Pitroda |
| 5,594,493 A | 1/1997 | Nemirofsky |
| 5,612,868 A | 3/1997 | Off et al. |
| 5,621,812 A | 4/1997 | Deaton et al. |
| 5,642,485 A | 6/1997 | Deaton et al. |
| 5,644,723 A | 7/1997 | Deaton et al. |
| 5,649,114 A | 7/1997 | Deaton et al. |
| 5,649,118 A | 7/1997 | Carlisle et al. |
| 5,650,209 A | 7/1997 | Ramsburg et al. |
| 5,687,322 A | 11/1997 | Deaton et al. |
| 5,689,100 A | 11/1997 | Carrithers et al. |
| 5,710,886 A | 1/1998 | Christensen et al. |
| 5,727,153 A | 3/1998 | Powell |
| 5,734,838 A | 3/1998 | Robinson et al. |
| 5,739,512 A * | 4/1998 | Tognazzini ............. 235/380 |
| 5,742,845 A | 4/1998 | Wagner |
| 5,754,762 A | 5/1998 | Kuo et al. |
| 5,761,648 A | 6/1998 | Golden et al. |
| 5,765,141 A | 6/1998 | Spector |
| 5,767,896 A | 6/1998 | Nemirofsky |
| 5,774,870 A | 6/1998 | Storey |
| 5,776,287 A | 7/1998 | Best et al. |
| 5,791,991 A | 8/1998 | Small |
| 5,794,210 A | 8/1998 | Goldhaber et al. |
| 5,797,126 A | 8/1998 | Helbling et al. |
| 5,802,519 A | 9/1998 | De Jong |
| 5,804,806 A | 9/1998 | Haddad et al. |
| 5,806,044 A | 9/1998 | Powell |
| 5,806,045 A | 9/1998 | Biorge et al. |
| 5,815,658 A | 9/1998 | Kuriyama |
| 5,822,735 A | 10/1998 | De Lapa et al. |
| 5,822,737 A | 10/1998 | Ogram |
| 5,832,457 A | 11/1998 | O'Brien et al. |
| 5,844,218 A | 12/1998 | Kawan et al. |
| 5,845,259 A | 12/1998 | West et al. |
| 5,855,007 A | 12/1998 | Jovicic et al. |
| 5,857,175 A | 1/1999 | Day et al. |
| 5,859,419 A | 1/1999 | Wynn |
| RE36,116 E | 2/1999 | McCarthy |
| 5,865,340 A | 2/1999 | Alvern |
| 5,865,470 A | 2/1999 | Thompson |
| 5,868,498 A | 2/1999 | Martin |
| 5,880,769 A | 3/1999 | Nemirofsky et al. |
| 5,884,271 A | 3/1999 | Pitroda |
| 5,884,277 A | 3/1999 | Khosla |
| 5,884,278 A | 3/1999 | Powell |
| 5,887,271 A | 3/1999 | Powell |
| 5,890,135 A | 3/1999 | Powell |
| 5,892,827 A | 4/1999 | Beach et al. |
| 5,898,838 A | 4/1999 | Wagner |
| 5,903,732 A | 5/1999 | Reed et al. |
| 5,905,246 A | 5/1999 | Fajkowski |
| 5,905,908 A | 5/1999 | Wagner |
| 5,907,350 A | 5/1999 | Nemirofsky |
| 5,907,830 A | 5/1999 | Engel et al. |
| 5,909,486 A | 6/1999 | Walker et al. |
| 5,912,453 A | 6/1999 | Gungl et al. |
| 5,915,244 A | 6/1999 | Jack et al. |
| 5,923,735 A * | 7/1999 | Swartz et al. ............. 379/93.12 |
| 5,923,884 A | 7/1999 | Peyret et al. |
| 5,924,072 A | 7/1999 | Havens |
| 5,926,795 A | 7/1999 | Williams |
| 5,928,082 A | 7/1999 | Clapper, Jr. |
| 5,931,947 A | 8/1999 | Burns et al. |
| 5,943,651 A | 8/1999 | Oosawa |
| 5,950,173 A | 9/1999 | Perkowski |
| 5,953,047 A | 9/1999 | Nemirofsky |
| 5,953,705 A | 9/1999 | Oneda |
| 5,956,694 A | 9/1999 | Powell |
| 5,956,695 A | 9/1999 | Carrithers et al. |
| 5,958,174 A | 9/1999 | Ramsberg et al. |
| 5,960,082 A | 9/1999 | Haenel |
| 5,963,917 A | 10/1999 | Ogram |
| 5,969,318 A | 10/1999 | Mackenthun |
| 5,970,469 A | 10/1999 | Scroggie et al. |

| | | | |
|---|---|---|---|
| 5,974,399 A | 10/1999 | Giuliani et al. | |
| 5,974,549 A | 10/1999 | Golan | |
| 5,978,013 A | 11/1999 | Jones et al. | |
| 5,987,795 A | 11/1999 | Wilson | |
| 5,997,042 A | 12/1999 | Blank | |
| 6,000,608 A | 12/1999 | Dorf | |
| 6,002,771 A | 12/1999 | Nielsen | |
| 6,003,113 A | 12/1999 | Hoshino | |
| 6,003,134 A | 12/1999 | Kuo et al. | |
| 6,005,942 A | 12/1999 | Chan et al. | |
| 6,009,411 A | 12/1999 | Kepecs | |
| 6,012,635 A | 1/2000 | Shimada et al. | |
| 6,014,634 A | 1/2000 | Scroggie et al. | |
| 6,024,286 A | 2/2000 | Bradley et al. | |
| 6,035,280 A | 3/2000 | Christensen | |
| 6,038,551 A | 3/2000 | Barlow et al. | |
| 6,041,309 A | 3/2000 | Laor | |
| 6,047,325 A | 4/2000 | Jain et al. | |
| 6,049,778 A | 4/2000 | Walker et al. | |
| 6,052,468 A | 4/2000 | Hillhouse | |
| 6,052,690 A | 4/2000 | de Jong | |
| 6,052,785 A | 4/2000 | Lin et al. | |
| 6,055,509 A | 4/2000 | Powell | |
| 6,055,573 A * | 4/2000 | Gardenswartz et al. | 709/224 |
| 6,061,660 A | 5/2000 | Eggleston et al. | |
| 6,067,526 A | 5/2000 | Powell | |
| 6,070,147 A | 5/2000 | Harms et al. | |
| 6,073,238 A | 6/2000 | Drupsteen | |
| 6,076,068 A | 6/2000 | DeLapa et al. | |
| 6,076,069 A | 6/2000 | Laor | |
| 6,089,611 A | 7/2000 | Blank | |
| 6,094,656 A | 7/2000 | De Jong | |
| 6,101,422 A | 8/2000 | Furlong | |
| 6,101,477 A | 8/2000 | Hohle et al. | |
| 6,105,002 A | 8/2000 | Powell | |
| 6,105,865 A | 8/2000 | Hardesty | |
| 6,105,873 A | 8/2000 | Jeger | |
| 6,112,987 A | 9/2000 | Lambert et al. | |
| 6,112,988 A | 9/2000 | Powell | |
| 6,119,933 A | 9/2000 | Wong et al. | |
| 6,119,945 A | 9/2000 | Muller et al. | |
| 6,122,631 A | 9/2000 | Berbec et al. | |
| 6,129,274 A | 10/2000 | Suzuki | |
| 6,135,351 A | 10/2000 | Shiobara et al. | |
| 6,142,369 A * | 11/2000 | Jonstromer | 235/380 |
| 6,144,948 A | 11/2000 | Walker et al. | |
| 6,151,586 A | 11/2000 | Brown | |
| 6,151,587 A | 11/2000 | Matthias | |
| 6,154,751 A | 11/2000 | Ault et al. | |
| 6,161,870 A | 12/2000 | Blank | |
| 6,164,549 A | 12/2000 | Richards | |
| 6,170,061 B1 | 1/2001 | Beser | |
| 6,173,269 B1 | 1/2001 | Solokl et al. | |
| 6,173,891 B1 | 1/2001 | Powell | |
| 6,179,205 B1 | 1/2001 | Sloan | |
| 6,179,710 B1 | 1/2001 | Sawyer et al. | |
| 6,183,017 B1 | 2/2001 | Najor et al. | |
| 6,185,541 B1 | 2/2001 | Scroggie et al. | |
| 6,189,100 B1 | 2/2001 | Barr et al. | |
| 6,189,787 B1 | 2/2001 | Dorf | |
| 6,195,666 B1 | 2/2001 | Schneck et al. | |
| 6,210,276 B1 | 4/2001 | Mullins | |
| 6,216,014 B1 | 4/2001 | Proust et al. | |
| 6,216,204 B1 | 4/2001 | Thiriet | |
| 6,220,510 B1 | 4/2001 | Everett et al. | |
| 6,222,914 B1 | 4/2001 | McMullin | |
| 6,230,143 B1 | 5/2001 | Simons et al. | |
| 6,237,145 B1 | 5/2001 | Narasimhan et al. | |
| 6,241,287 B1 | 6/2001 | Best et al. | |
| 6,243,687 B1 | 6/2001 | Powell | |
| 6,243,688 B1 | 6/2001 | Kalina | |
| 6,244,958 B1 | 6/2001 | Acres | |
| 6,246,997 B1 * | 6/2001 | Cybul et al. | 705/27 |
| 6,266,647 B1 | 7/2001 | Fernandez | |
| 6,267,263 B1 | 7/2001 | Emoff et al. | |
| 6,269,158 B1 | 7/2001 | Kim | |
| 6,279,112 B1 | 8/2001 | O'Toole, Jr. et al. | |
| 6,282,516 B1 | 8/2001 | Giuliani | |
| 6,292,785 B1 | 9/2001 | McEvoy et al. | |
| 6,292,786 B1 | 9/2001 | Deaton et al. | |
| 6,296,191 B1 | 10/2001 | Hamann et al. | |
| 6,299,530 B1 | 10/2001 | Hansted et al. | |
| 6,321,208 B1 | 11/2001 | Barnett et al. | |
| 6,327,576 B1 | 12/2001 | Ogasawara | |
| 6,341,353 B1 * | 1/2002 | Herman et al. | 726/5 |
| 6,385,723 B1 | 5/2002 | Richards | |
| 6,390,374 B1 | 5/2002 | Carper et al. | |
| 6,394,341 B1 * | 5/2002 | Makipaa et al. | 235/379 |
| 6,480,935 B1 | 11/2002 | Carper et al. | |
| 6,487,540 B1 * | 11/2002 | Smith et al. | 705/21 |
| 6,549,773 B1 | 4/2003 | Linden et al. | |
| 6,549,912 B1 | 4/2003 | Chen | |
| 6,612,490 B1 | 9/2003 | Herrendoerfer et al. | |
| 6,681,995 B2 | 1/2004 | Sukeda et al. | |
| 6,689,345 B2 | 2/2004 | Jager Lezer | |
| 6,898,598 B2 * | 5/2005 | Himmel et al. | 707/10 |
| 6,975,856 B2 * | 12/2005 | Ogasawara | 455/419 |
| 2001/0016835 A1 * | 8/2001 | Hansmann et al. | 705/40 |
| 2001/0037312 A1 * | 11/2001 | Gray et al. | 705/67 |
| 2002/0002468 A1 | 1/2002 | Spagna et al. | |
| 2002/0073025 A1 * | 6/2002 | Tanner et al. | 705/39 |
| 2002/0073331 A1 * | 6/2002 | Candelore | 713/200 |
| 2002/0076051 A1 | 6/2002 | Nii | |
| 2002/0077992 A1 * | 6/2002 | Tobin | 705/65 |
| 2002/0087894 A1 * | 7/2002 | Foley et al. | 713/202 |
| 2002/0128878 A1 * | 9/2002 | Maritzen et al. | 705/4 |
| 2002/0188561 A1 * | 12/2002 | Schultz | 705/40 |
| 2003/0014372 A1 * | 1/2003 | Wheeler et al. | 705/71 |
| 2003/0055733 A1 * | 3/2003 | Marshall et al. | 705/24 |
| 2003/0126020 A1 * | 7/2003 | Smith et al. | 705/21 |
| 2003/0233279 A1 * | 12/2003 | Shinzaki | 705/21 |
| 2006/0273163 A1 * | 12/2006 | Gusler et al. | 235/383 |

FOREIGN PATENT DOCUMENTS

| | | |
|---|---|---|
| BE | 1002756 A6 | 5/1991 |
| CA | 2293944 | 8/2000 |
| CA | 2267041 | 9/2000 |
| CA | 2317138 A1 | 1/2002 |
| DE | 19522527 A1 | 1/1997 |
| DE | 19848712 A1 | 4/2000 |
| DE | 19960978 A1 | 8/2000 |
| DE | 10015103 A1 | 10/2000 |
| EP | 0203424 A2 | 12/1986 |
| EP | 0292248 A2 | 11/1988 |
| EP | 0475837 A1 | 3/1992 |
| EP | 0540095 A1 | 5/1993 |
| EP | 0658862 A2 | 6/1995 |
| EP | 0675614 A1 | 10/1995 |
| EP | 0682327 A2 | 11/1995 |
| EP | 0875841 A2 | 11/1998 |
| EP | 0936530 A1 | 8/1999 |
| EP | 0938050 A2 | 8/1999 |
| EP | 0938051 A2 | 8/1999 |
| EP | 0944007 A2 | 9/1999 |
| EP | 0949595 A2 | 10/1999 |
| EP | 0982692 A2 | 3/2000 |
| EP | 0984404 A2 | 3/2000 |
| EP | 1085395 A2 | 3/2001 |
| EP | 1102320 A1 | 5/2001 |
| EP | 1111505 A1 | 6/2001 |
| EP | 1113387 A2 | 7/2001 |
| EP | 1113407 A2 | 7/2001 |
| EP | 1168137 A1 | 1/2002 |
| EP | 1233333 A1 | 8/2002 |
| FR | 2772957 A1 | 6/1999 |

| | | | |
|---|---|---|---|
| FR | 2793048 A1 | 11/2000 |
| FR | 2794543 A1 | 12/2000 |
| FR | 2796176 A1 | 1/2001 |
| FR | 2804234 A1 | 7/2001 |
| GB | 2331381 A | 5/1999 |
| GB | 2343091 A | 4/2000 |
| GB | 2351379 A | 12/2000 |
| GB | 2355324 A | 4/2001 |
| JP | 2000-112864 A | 4/2000 |
| JP | 2000-181764 A | 6/2000 |
| JP | 2001-202484 A | 7/2001 |
| JP | 2001-236232 A | 8/2001 |
| KR | 0039297 A | 5/2001 |
| KR | 0044823 A | 6/2001 |
| KR | 0058742 A | 7/2001 |
| KR | 0021237 A | 3/2002 |
| WO | WO 90/16126 A1 | 12/1990 |
| WO | WO 96/25724 A1 | 8/1996 |
| WO | WO 96/38945 A1 | 12/1996 |
| WO | WO 96/42109 A1 | 12/1996 |
| WO | WO 97/05582 A1 | 2/1997 |
| WO | WO 97/10562 A1 | 3/1997 |
| WO | WO 97/39424 A1 | 10/1997 |
| WO | WO 98/02834 A1 | 1/1998 |
| WO | WO 98/09257 A1 | 3/1998 |
| WO | WO 98/20465 A1 | 5/1998 |
| WO | WO 98/43169 A2 | 10/1998 |
| WO | WO 98/43212 A1 | 10/1998 |
| WO | WO 98/52153 A2 | 11/1998 |
| WO | WO 99/10824 A1 | 3/1999 |
| WO | WO 99/16030 A1 | 4/1999 |
| WO | WO 99/19846 A2 | 4/1999 |
| WO | WO 99/44172 A1 | 9/1999 |
| WO | WO 99/45507 A1 | 9/1999 |
| WO | WO 99/49415 A2 | 9/1999 |
| WO | WO 99/49426 A1 | 9/1999 |
| WO | WO 00/39714 A1 | 7/2000 |
| WO | WO 00/46665 A2 | 8/2000 |
| WO | WO 00/54507 A1 | 9/2000 |
| WO | WO 00/57315 A2 | 9/2000 |
| WO | WO 00/57613 A1 | 9/2000 |
| WO | WO 00/62265 A1 | 10/2000 |
| WO | WO 00/62472 A1 | 10/2000 |
| WO | WO 00/67185 A1 | 11/2000 |
| WO | WO 00/68797 A1 | 11/2000 |
| WO | WO 00/68902 A1 | 11/2000 |
| WO | WO 00/68903 A1 | 11/2000 |
| WO | WO 00/69183 A2 | 11/2000 |
| WO | WO 00/75775 A2 | 12/2000 |
| WO | WO 00/77750 A1 | 12/2000 |
| WO | WO 01/04851 A1 | 1/2001 |
| WO | WO 01/06341 A1 | 1/2001 |
| WO | WO 01/08087 A1 | 2/2001 |
| WO | WO 01/13572 A1 | 2/2001 |
| WO | WO 01/15397 A1 | 3/2001 |
| WO | WO 01/18633 A1 | 3/2001 |
| WO | WO 01/18746 A1 | 3/2001 |
| WO | WO 01/29672 A1 | 4/2001 |
| WO | WO 01/33390 A2 | 5/2001 |
| WO | WO 01/40908 A1 | 6/2001 |
| WO | WO 01/42887 A2 | 6/2001 |
| WO | WO 01/44900 A2 | 6/2001 |
| WO | WO 01/44949 A2 | 6/2001 |
| WO | WO 01/47176 A1 | 6/2001 |
| WO | WO 01/50229 A2 | 7/2001 |
| WO | WO 01/52575 A1 | 7/2001 |
| WO | WO 01/55955 A1 | 8/2001 |
| WO | WO 01/59563 A1 | 8/2001 |
| WO | WO 01/61620 A1 | 8/2001 |
| WO | WO 01/65545 A2 | 9/2001 |
| WO | WO 01/67694 A1 | 9/2001 |
| WO | WO 01/71648 A2 | 9/2001 |
| WO | WO 01/71679 A2 | 9/2001 |
| WO | WO 01/73530 A2 | 10/2001 |
| WO | WO 01/73533 A1 | 10/2001 |
| WO | WO 01/78020 A1 | 10/2001 |
| WO | WO 01/80563 A1 | 10/2001 |
| WO | WO 01/84377 A2 | 11/2001 |
| WO | WO 01/84474 A2 | 11/2001 |
| WO | WO 01/84512 A1 | 11/2001 |
| WO | WO 01/88705 A1 | 11/2001 |
| WO | WO 02/06948 A1 | 1/2002 |
| WO | WO 02/10962 A1 | 2/2002 |
| WO | WO 02/14991 A2 | 2/2002 |
| WO | WO 02/15037 A1 | 2/2002 |
| WO | WO 02/21315 A1 | 3/2002 |
| WO | WO 02/29577 A2 | 4/2002 |
| WO | WO 02/088895 A2 | 11/2002 |

OTHER PUBLICATIONS

Reading between lines: Anderson Alan; Enterprise Systms Journal, V 15, N8, p. 44, Aug. 2000.*
"Internet based secure transactions using encrypting applets and cgi-scripts Independent of browser or server capabilities"; 1998, *IBM Research Disclosure*, No. 410116, pp. 800-801.
Office Action from U.S. Appl. No. 10/676,508, dated Mar. 11, 2009.
Office Action from U.S. Appl. No. 10/676,508, dated Sep. 26, 2008.
Office Action from U.S. Appl. No. 10/676,508, dated Apr. 16, 2008.
Office Action from U.S. Appl. No. 12/359,244, dated May 28, 2009.
Office Action from U.S. Appl. No. 12/359,248, dated May 27, 2009.

* cited by examiner

METHOD AND SERVER FOR MANAGEMENT OF ELECTRONIC RECEIPTS

CROSS-REFERENCE(S) TO RELATED APPLICATION(S)

The present application is a continuation of U.S. patent application Ser. No. 10/676,508, filed Sep. 30, 2003, which claims benefit of priority under 35 U.S.C. §119 from U.S. Provisional Patent Application No. 60/467,710, entitled "METHOD AND APPARATUS FOR MANAGEMENT OF ELECTRONIC RECEIPTS ON PORTABLE DEVICES", filed on May 2, 2003, the entireties of which are hereby incorporated by reference for all purposes.

BACKGROUND OF THE INVENTION

In a variety of transactions, customers or buyers of goods or services typically receive receipts from their respective merchants or service providers as proof of existence of conducted transactions. Generally, receipts are issued by merchants and service providers for a number of reasons including, for example, regulatory or tax reasons and convenience purposes. A receipt provides information about a corresponding transaction for the purpose of providing all participants with a trace or record of the transaction. Receipts may be used for various purposes including, for example, proving participation in a transaction for tax reporting purpose; managing exception situations arising from a transaction, such as, product return; facilitating a subsequent transaction between a service user and a service provider, such as, being used as a claim ticket for equipment on repair; or facilitating provision of complementary services, such as, warranties.

Generally, receipts are provided in printed form. There is, however, a number of shortcomings associated with printed receipts. For example, printed receipts contribute to operating costs for the merchants and service providers. Also, printed receipts once they are issued to the consumers are difficult to track and/or audit. This limited ability to track and audit printed receipts makes them particularly susceptible to fraudulent uses (such as, forgery, misuse, etc.). Furthermore, from a consumer standpoint, printed receipts have limited convenience inherent to their physical attributes.

In some systems, electronic receipts are stored on a portable device. However, storing of the electronic receipts is often performed on an ad hoc basis and such systems do not provide any meaningful management of the electronic receipts after they have been stored.

Hence, it would be desirable to provide methods and systems that are capable of addressing the foregoing and other issues and managing and using electronic receipts in a more efficient manner.

BRIEF SUMMARY OF THE INVENTION

A system for managing electronic receipts is provided. According to one embodiment, the system includes a portable device, a base device, a user device and an electronic receipts administration system. The electronic receipts administration system provides the base device with the appropriate data to allow the base device to generate, store and manage electronic receipts accordingly. A user uses the portable device to conduct a transaction with the base device. The base device uses a variety of information to generate an electronic receipt for the transaction. Such information includes, for example, information stored on the portable device, information stored locally on the base device and information stored on another device such as an electronic cash register. The electronic receipt is then stored on the portable device. The user device allows the user to subsequently retrieve the electronic receipt for management purposes.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

DETAILED DESCRIPTION OF THE INVENTION

Figure 1:
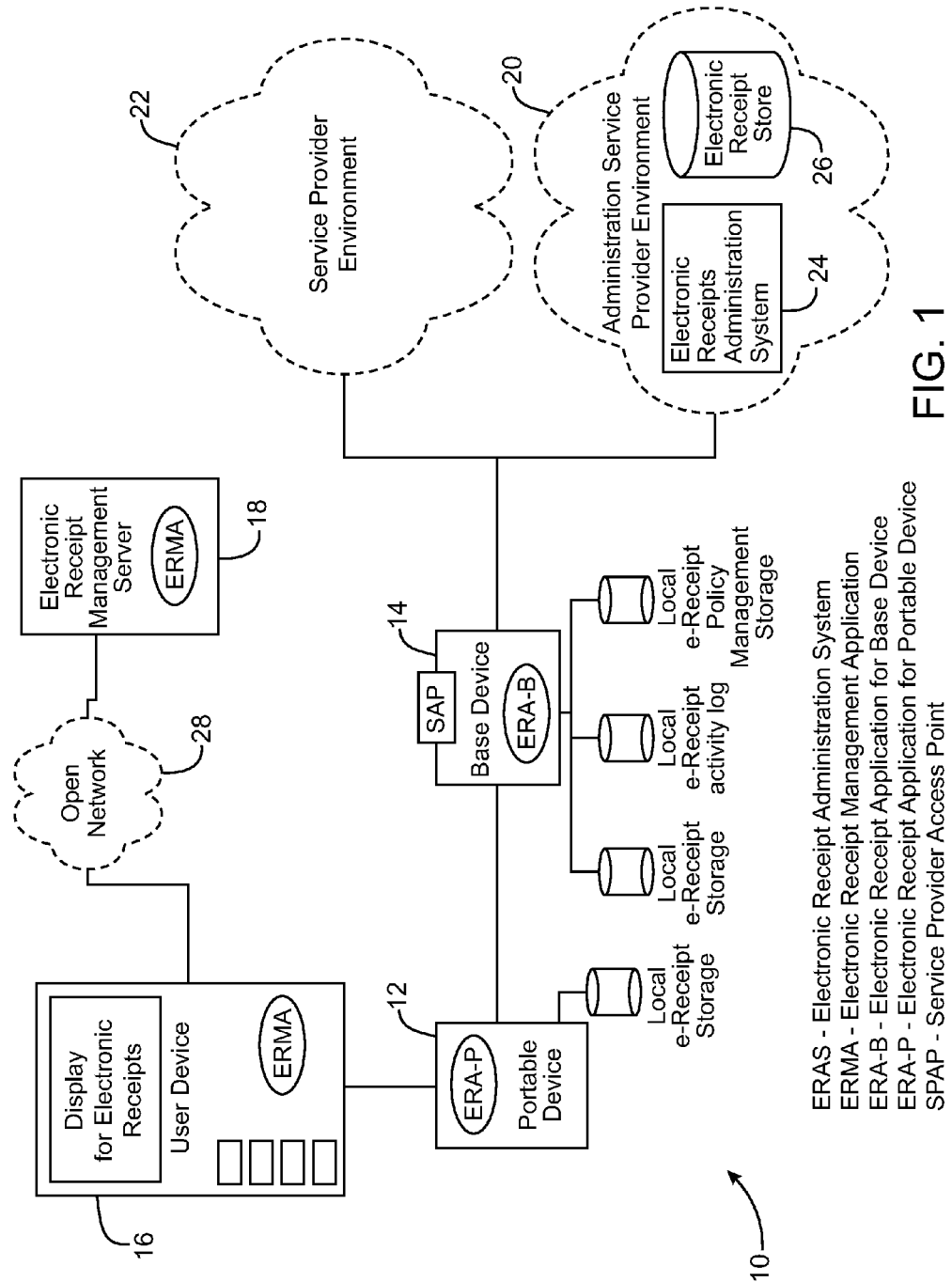
FIG. 1 is a simplified schematic block diagram illustrating an embodiment of the present invention.

The present invention in the form of one or more exemplary embodiments will now be described. FIG. 1 is a simplified schematic block diagram illustrating a system according to one embodiment of the present invention. In one embodiment, the system 10 has a number of elements including a portable device 12, a base device 14, a user device 16, an electronic receipt management server 18, a service provider environment 22 and an administration service provider environment 20. The service provider environment 22 includes one or more systems and/or computers that allow the service provider to provide services to its customers. The administration service provider environment 20 includes an electronic receipt administration system 24 and an electronic receipt store 26. In an alternative embodiment, the functionality provided by the administration service provider environment 20 may be incorporated into the service provider environment 22. As will be further described below, the various elements of the system 10 allow for generation, storage and management of electronic receipts by a number of different parties including, for example, a customer who receives the electronic receipt, a service provider who issues the electronic receipt, and any other party that may have an interest in accessing or obtaining the electronic receipt. It should be understood that in other embodiments (not shown), multiple instances of each element of the system 10 may be present.

The portable device 12 is a uniquely identifiable personal device, with storage and computing ability and sets of unique identifying characteristics. The portable device 12 contains a unique identifier determined by the portable device issuer. Such identifier may be in the form of an account number. The portable device may also contain personal information on the device user, such as, a name, an address, and other demographics information. Examples of a portable device include, smart cards, personal digital assistants (PDAs), cellular phones, pagers, memory sticks, secure digital (SD) cards, dongles, payment cards, etc. The portable device 12 (or the software or hardware that allows the portable device 12 to perform its various functions) can be issued by an entity, such as, a financial institution, a business entity and a payment card company. As will be further described below, the portable device 12 can be used by a user or consumer to conduct a transaction with a service provider via the base device 14. As part of the transaction, the portable device 12 interacts with the base device 14 in order to generate an electronic receipt. The electronic receipt is then stored in the portable device 12 for subsequent processing and management.

The portable device 12 is capable of storing a multiplicity of electronic receipts. The maximum number of electronic receipts that can be stored on the portable device 12 depends on a number of factors, such as, portable device memory capacity and design and constraints of the issuer of the portable device 12.

The portable device 12 further allows the stored electronic receipts to be accessed. Optionally, the portable device 12 may be programmed so as to require user authentication prior to releasing an individual electronic receipt for access.

In one embodiment, the portable device 12 includes a communication module, a computing module, and a storage module. The communication module interfaces with the base device 14 by means of one of a number of connections including, for example, direct electrical connection, infrared connection or radio frequency based connection. The computing module interfaces between the communication and storage modules and is capable of executing control logic as needed to control addressing of the storage area of the storage module and access to the information in storage, assessing the integrity of the information, or performing security, encryption, or authentication functions. The storage module is capable of storing electrical information even upon the power down of the portable device 12.

Data storage on the portable device 12 includes at least a local electronic receipt database or file. The local electronic receipt database is used to store electronic receipts generated for transactions conducted with the portable device 12 and is organized in such a fashion as to allow identification of and access to the electronic receipts according to their contents, which may include a substantially unique receipt identifier.

The base device 14 is a device with computing and local storage ability. The base device 14 interacts with the portable device 12 to generate an electronic receipt for a transaction. The base device 14 is capable of acquiring and storing, optionally in a secure fashion, various types of information that is used to generate electronic receipts. Information that is stored on the base device 14 includes unique base device identification characteristics and transaction event information, such as, services and products delivered, prices paid, accounts used for payment, service due dates, etc. The base device 14 receives the various types of information from one or more different sources including, for example, the portable device 12, the service provider environment 22, the administration service provider environment 20 and other peripheral devices. For example, the service provider environment 22 may include peripheral devices, such as, an electronic cash register, which can supply information including price and product information to the base device 14 for incorporation into an electronic receipt. Furthermore, the base device 14 may also include facilities to allow information to be entered directly into the base device 14.

In one embodiment, the base device 14 includes a local electronic receipt database or file, a local electronic receipt activity log and a local electronic receipt policy management storage. The base device 14 interfaces between the portable device 12 and the administration service provider environment 20 to allow a user to conduct a transaction for the purchase of products and/or services. Examples of a base device 14 include point of sales (POS) devices, ATMs, kiosks, personal computers, cellular phones and regular telephones.

The local electronic receipt database is used to store electronic receipts generated by the base device 14. The local electronic receipt activity log is used to maintain historical information for transactions conducted via the base device 14. Information from the local electronic receipt database and the local electronic receipt activity log may be exported or forwarded to the electronic receipt administration system 24 and other systems or devices for reporting and other purposes. Such other systems or devices may be applications residing within or without the base device 14 including, for example, a peripheral device such as an electronic cash register in the service provider environment 20.

The local electronic receipt policy management storage is used to store policies including terms and conditions relating to generation and management of electronic receipts. The electronic receipts administration system 24 provides the corresponding policy for the service provider to the base device 14. In embodiments where the base device 14 is capable of communicating with a number of different electronic receipts administration systems 24, the local electronic receipt policy management storage of the base device 14 may include different policies for different service providers.

The base device 14 is further capable of erasing an electronic receipt from its local electronic receipt database or the portable device 12 with which the base device 14 is interacting, automatically upon the end of its validity period or upon confirmation by the user of the portable device 12.

In one embodiment, the base device 14 includes local and remote communications modules, optionally user interface modules, a computing module and a local storage module. These modules may be implemented using software or hardware or a combination of both.

The communication module of the base device 14 is capable of communicating with the portable device 12 via one of a number methods including, for example, radio frequency, infrared and direct electrical connections.

The remote communication module of the base device 14 is capable of communicating on a substantially real time basis with the electronic receipts administration system 24. The remote communication module of the base device 14 may also interface with other systems involved in processing a transaction, such as, the service provider environment 22, which the base device 14 may query for transaction data.

The user device 16 is a device with computing and local storage capability capable of communicating with the portable device 12 and other devices to perform a number of functions including, for example, retrieving electronic receipts from the portable device 12, storing the retrieved electronic receipts locally, displaying the electronic receipts for management, and exporting information from the electronic receipts for use with other applications and/or services that reside either within or without the user device 16. Examples of a user device 16 include personal computers, personal digital assistants (PDAs), cell phones and kiosks.

The user device 16 is a convenience system allowing the user to interface with the portable device 12 for the purpose of managing the electronic receipts stored in the portable device 12. The user device 16 allows the user of the portable device 12 to manage the electronic receipts stored on the portable device in a number of ways. For example, the status of the portable device 12 may be displayed by the user device 16, such as, electronic receipt stored, memory available, etc. The electronic receipts can be displayed in an organized fashion by the user device 16. The user may exchange information between the portable device 12 and the user device 16. The user may selectively delete electronic receipts stored on the portable device 12 or transfer some or all of the electronic receipts from the portable device 12 to the user device 16. The user may also selectively delete electronic receipts that were previously transferred to the user device 16 or download previously transferred electronic receipts from the user device 16 to the portable device 12. Electronic receipts on the portable device 12 may also be duplicated onto the user device 16, for the purpose of saving a copy of an electronic receipt, which copy may include specific information identifying it as a duplicate.

In one embodiment, the user device 16 includes a communication module capable of interfacing with the portable device 12 through such means as direct electrical connections, infrared communication or radio frequency based communication; a display interface, such as, a screen, a printer, a keypad, touch screen, tablet, mouse and a system capable of providing an interface via the sense of sight or touch; a computing system capable of running specific control logic used to retrieve and display electronic receipts; a local storage component capable of storing electronic receipts uploaded from the portable device 12.

The user device 16 may be configured for use directly in conjunction with the portable device 12 or other devices in an off-line manner to provide local receipt management or to interface, through an open network 28, with the electronic receipt management server 18, where the electronic receipt storage and management functions are performed. The open network 28 may include the Internet, a local area network, a wide area network and other types of computer networks. Alternatively, the user device 16 may communicate with the electronic receipt management server 18 via a dedicated communication link, such as, a dialup link, a T1 line and a T3 line, etc. The electronic receipt management server 18 or other devices may or may not be owned and operated by the entity operating the electronic receipts administration system 24. However, communications from the user device 12 and the electronic receipt management server 18 and other devices may be secured or otherwise be defined according to the specification provided by the administration service provider environment 20.

The electronic receipts administration system 24 is capable of communicating with the base device 14 on a substantially real time basis, directly or through an intermediary network, for the purpose of managing the base device 14.

The electronic receipts administration system 24 includes control logic used to register and manage the base device 14. The base device 14 is assigned an unique base device identifier (UBDID) generated by the electronic receipt administration system 24. In one implementation, the UBDID includes an unique number that can be used to identify the base device 14. Optionally, the UBDID includes a location identifier that is used to identify the location of the base device 14. The location identifier may contain sub-fields to not only identify a location but possibly a lane or point of service location within the location. The location may be a physical location or an Internet location. Furthermore, the UBDID may also include discretionary data, such as, a name, an address, and a phone number.

The electronic receipts administration system 24 may also use the UBDID to identify the service provider involved in the transaction. The UBDID may further include information relating to a service provider. As a result, base devices 14 belonging to a particular service provider can be identified.

The UBDID may be constructed as a fixed identifier with specific sub-fields used for the unique number, location identifier, and discretionary data; or a variable length identifier made up of descriptor and data fields, the descriptor fields identifying the nature and length of the data, the data including the unique number, location identifier and discretionary data.

Information from the UBDID is incorporated into an electronic receipt generated by the base device 14. This allows the base device 14 identify electronic receipts that it generated. Furthermore, this provides added security with respect to access to the electronic receipts stored on the portable device 12 by the base device 14. The UBDID can be used as an authentication check to ensure that the base device 14 only accesses the electronic receipts that it generated.

The electronic receipts administration system 24 also controls generation and management of electronic receipts by the base device 14 by providing the data and control logic required locally by the base device 14 for the generation and management of electronic receipts. For example, the electronic receipts administration system 24 downloads the appropriate electronic receipt generation and management policy to the base device 14 to allow the base device 14 to generate and manage electronic receipts accordingly. Such policy include, for example, validity periods, conditions for retrieval, receipt security requirements, base device and portable device maximum storage capacity, or procedures for handling exceptions.

The electronic receipts administration system 24 further collects from the base device 14 information relating to the base device 14 and the electronic receipts generated by the base device 14. Such data may include data used by security algorithms to identify participating portable devices 12 at the base device 14, generate secure electronic receipts, and provide verification of integrity of an electronic receipt.

The electronic receipts administration system 24 performs a number of other functions. For example, the electronic receipts administration system 24 may collect from the base device 14 electronic receipts stored on the base device 14 for storage on the electronic receipts administration system 24 for the purpose of freeing memory on the base device 14. Electronic receipts stored on the base device 14 are duplicated and stored on the electronic receipts administration system 24 for the purpose of saving a copy of an electronic receipt, which copy may include specific information identifying it as a duplicate. Information from the electronic receipts is aggregated by the electronic receipts administration system 24 for the purpose of reporting as for instance in the case of customer service, or base device performance management. Such aggregated information may also be provided by the electronic receipts administration system 24 to other systems and/or services for various purposes, such as, tax reporting. The electronic receipts administration system 24 may further use the aggregated information to respond to administrative queries from the base device 14, such as, requests for electronic receipt back-up restoration or requests for receipt proofing based on comparison with a duplicate.

The system 10 operates in the following exemplary manner. When the user of the portable device 12 wishes to conduct a transaction with the service provider, the user directs the portable device 12 to interact with the base device 14, for example, by inserting the portable device 12 into the base device 14. The base device 14 retrieves information from the portable device 12 and, optionally, receives information from other peripheral devices, such as, an electronic cash register. The base device 14 then uses such information as well as other information that is available locally to produce an electronic receipt for the transaction. Information that is available locally includes, for example, unique base device characteristics, such as, the UBDID, and policies and terms and conditions for generating electronic receipts for the specific service provider. The electronic receipt is then provided to the portable device 12 where the electronic receipt is stored. A duplicate copy of the electronic receipt may be retained and stored in the base device 14.

Preferably, data contained in the electronic receipt is protected against tampering, and optionally against retrieval by an unauthorized source. The electronic receipt contains a variety of information including, for example, receipt status information (such as original, duplicated, invalid and deleted); a substantially unique receipt identifier; substantially unique transaction identifying information, such as, a transaction ID generated by the service provider, date, time, transaction amount when payment occurred, information on products and services delivered, and validity period; base device information, such as, the UBDID; a variable number of line items, each with a variable number of transaction specific information, such as, line item product or service obtained, price, terms and conditions of service; unique portable device identification information linking the electronic receipt to the portable device; account information linking the electronic receipt to the payment account used to pay for the transaction; and portable device user information.

The electronic receipt can also be displayed by the base device 14 and the user device 16. Depending on the respective configurations of the base device 14 and the user device 16, the electronic receipt can be displayed in different formats.

Electronic receipts may have individually or collectively defined access conditions identifying methods and/or security mechanisms that need to be satisfied in order to perform functions associated with the electronic receipts, such as, viewing, uploading, and canceling.

Electronic receipts are stored as logical records within data structures in the portable device 12 and optionally the base and user devices 14 and 16. In one embodiment, a record or data structure for storing an electronic receipt may contain a header, content descriptors and data. The header contains such information as may be required to (1) uniquely retrieve the electronic receipt stored in the portable device (such as start address, length for instance); (2) identify the electronic receipt (such as substantially unique receipt identifier); (3) link the electronic receipt to an UBDID; (4) implement receipt access conditions, and receipt confidentiality protection; and (5) identify the receipt state (including but not limited to the following three states: valid, canceled, copy).

The content descriptor includes information required to identify and retrieve any single field of an electronic receipt stored on the portable device 12, the base device 14 and the user device 16. Such descriptor may contain data labels or tags, and data lengths, using proprietary or standard specification as defined by the administration service provider environment 20.

In one embodiment, a record used for storing an electronic receipt includes a number of special fields. The special fields include a variety of data including, for example, (1) data used in the process of validating the integrity of the electronic receipt (tamper detection), such as, the result of a checksum or one-way hash function; (2) date of receipt creation and receipt validity period; (3) data identifying the portable device 14 on which the electronic receipt is first stored; (4) data which allow receipt management functions, such as, receipt transfer, receipt back-up, receipt duplication, and automatic receipt deletion at the end of its validity period.

The record used for storing an electronic receipt further includes a number of data fields which include (1) date and time of transaction; (2) reference or description of products and/or services provided; (3) price, payment terms and payment status; (4) portable device user information, such as, name or address; (5) base device defined data related to receipt formatting and presentation, such as, definitions of size, fonts, color, orientation, logos, brands or trademarks, or key messages specific to the user.

The storage of electronic receipts on the portable device 12 is logically structured so as to allow a number of functionality. For example, the base device 14 is able to scan through electronic receipts to identify which ones are related to or can be managed by the base device 14, without bypassing receipt access control conditions. The base device 14 is able to delete any expired electronic receipt (beyond its validity period) for which automatic deletion is allowed. The base device 14 is also able to verify the integrity of an electronic receipt. The portable device 12 is able to respond to a query for retrieving an electronic receipt from the base device 14 by satisfying the necessary access condition requirements, if any, defined in relation with the electronic receipt. In addition, the portable device 12 is able to respond to retrieval request from the user device 16, providing multiple electronic receipts upon satisfaction of a general retrieval access condition. The portable device 12 is able to refuse storage of an electronic receipt under certain conditions including, for example, when the memory capacity of the portable device 12 is exceeded.

In one embodiment, a number of data and file structures can be implemented to allow for the foregoing functionality, including, for example, (i) a receipt directory containing the receipt headers and the necessary pointers to the actual electronic receipt in a receipt database; (ii) the receipt database indexed by UBDID and receipt ID; and (iii) a flat file of predefined length, including for each electronic receipt a header followed by sequences of descriptor/data pairs.

Electronic receipts that may be off-loaded from the portable device 12 are linked with the portable device 12 for tracking purposes. The portable device 12 includes a unique identifier defined by the issuer of the portable device 12. The portable device identifier may be a fixed or variable length identifier. Electronic receipts generated by the portable device 12 include such unique identifier and, optionally, user information, such as, name, address and information relating to payment accounts that may be linked to the portable device 12 and used in the context of a transaction. User information may be constructed as fixed or variable length records with predefined contents or a set of variable length records made up of descriptor and data fields, the descriptor fields identifying the nature and length of the data, the data fields including such data as required to identify the user.

Electronic receipts can be manipulated in a wide variety of ways, as will be further described below. Generally, an electronic receipt is created and delivered at a point of service. Creation of an electronic receipt is initiated when the portable device 12 interacts with the base device 14. The base device 14 prompts for the portable device 12 used in the transaction and validates its ability to receive and store electronic receipts. The base device 14 then generates the receipt data and receipt records, based on the receipt policy associated with the transaction. In one implementation, the base device 14 contains the appropriate receipt policy; in an alternative implementation, the base device 14 obtains the appropriate receipt policy by querying complementary systems associated with the transaction, for instance, a cash register or the electronic receipts administration system 24. The base device 14 then communicates the electronic receipt to the portable device 12 for storage. The base device 14 may locally maintain a duplicate copy of the electronic receipt and an activity log of the receipt generation. The duplicate electronic receipt and data from the activity log can be uploaded to the electronic receipts administrative system at a later time.

An electronic receipt can be retrieved at the point of delivery of a service. In order to conduct a transaction, the base device 14 may require the retrieval of an electronic receipt previously stored on the portable device 12, for instance, in the case of a claim ticket. The base device 14 queries the portable device 12 and scans the electronic receipts stored on the portable device 12 to identify the appropriate electronic receipt using identification information, such as, an UBDID and relevant transaction information. The use of the UBDID allows the base device 14 to identify electronic receipts that it generated. The base device 14 and the portable device 12 then identify and execute the operations, if any, associated with the access control conditions for the electronic receipt, including but not limited to, verification of a user PIN or other means which indicates the positive acceptance by the user of access to the electronic receipt. Upon retrieval of the electronic receipt, the base device 14 checks, if required, the validity of the electronic receipt. In the case of multiple electronic receipts having been retrieved, the base device 14 may prompt the user to select the appropriate one based on such information contained in the electronic receipts as a receipt ID, a transaction date, a transaction amount or a product or service descriptor. The base device 14 may locally maintain a log of the electronic receipts retrieved for later upload to the electronic receipt administration system 20.

An electronic receipt can be deleted or canceled on the portable device 12. The base device 14 having retrieved an electronic receipt from the portable device 12 may require its deletion in the portable device 12 to avoid exception situation at a later date, such as, fraudulent claims. This would be the case, for instance, in the case of a claim ticket exchanged for a high value item. For example, upon a user requesting redemption for a service or merchandise, the base device 14 retrieves a corresponding electronic receipt from the portable device 12. Once the service or merchandise is redeemed, the corresponding electronic receipt on the portable device 12 is deleted from the portable device 12. A receipt deletion is requested by the base device 14 but executed by the portable device 12, in accordance with access control conditions. An electronic receipt can be logically deleted (or cancelled) by altering its state indicator, thus allowing the user to later upload the information to the user device 16; or the electronic receipt can be physically deleted from the memory of the portable device 12 to free up storage space. The base device 14 may locally maintain a log of the receipt deletion or cancellation for later upload to the electronic receipts administrative system 24.

Expired electronic receipts can also be deleted or canceled on the portable device 12. According to the receipt management policy and access control conditions, if any, defined for an electronic receipt, the base device 14 may optionally cancel electronic receipts stored in the portable device 12 that are no longer valid. This function ensures that portable device memory is optimally used. Execution of such function may occur during any of the interactions between the base device 14 and the portable device 12, and, preferably, in instances where a new electronic receipt is created and stored on the portable device 12. The base device 14 may locally log information about the canceled electronic receipts for later upload to the electronic receipts administrative system 24.

Electronic receipts stored on the portable device 12 can be displayed for management by the user. The portable device 12 may be queried by the user using the user device 16 looking to retrieve information on some or all the electronic receipts stored on the portable device 12 in order to facilitate receipt management. Examples of use of this function would be to allow receipt display and sorting by the user as a preamble to other management activities. Electronic receipts that are to be retrieved and displayed may be subject to management and access conditions, individually or collectively. For example, the user device 16 may need to satisfy a general access condition applicable to a specific group of electronic receipts. Depending on the management and access conditions, receipt information may not be copied and retained on the user device 16 for a number of reasons including, for example, preventing fraudulent duplication and use.

A user using the user device 16 to review electronic receipts on the portable device 12 may find it desirable to manage such receipts in a number of ways including, for example, receipt duplication, storage, sharing, deletion or cancellation, and restoration.

An electronic receipt is duplicated when a copy is uploaded from the portable device 12 into the user device 16 or the base device 14. The status information contained in the copy may be updated so as to reflect the duplication so as to, for example, avoid fraudulent use of reproduced receipts.

An electronic receipt is stored or parked when it is uploaded from the portable device 12 into the user device 16 and the original copy in the portable device 12 is deleted. Parking an electronic receipt is performed to free memory from the portable device 12 without permanently losing the electronic receipt. Parking the electronic receipt allows for its later use by downloading it back to the portable device 12. Parking of an electronic receipt may be subject to the fulfillment of management and access control conditions, if any.

An electronic receipt is exported when the transaction information it contains is made available to a different application in or via the base device 14 or the user device 16. For example, information from an electronic receipt may be provided to an accounting application. The accounting application may reside in or be external to the base device 14 or the user device 16. Exporting an electronic receipt is not akin to duplicating it in that not all the information in the electronic receipt is reproduced. For example, administrative information associated with the electronic receipt, such as, the management and access control conditions, may not be duplicated. Exporting of an electronic receipt may be subject to the fulfillment of management and access control conditions.

Deleting or canceling an electronic receipt renders it invalid. A deletion is a physical removal of the electronic receipt from storage. A cancellation is a logical equivalent of a deletion by altering a state code. A canceled electronic receipt may be overwritten at any time by a new electronic receipt. Depending on the management and access control conditions, receipt deletion/cancellation can occur by choice of the user or automatically (e.g., for expired receipts) at the base device 14.

Receipt restoration may occur in the case of the loss of the original electronic receipt. This may happen in the case of the replacement of a lost or defective portable device 12 or as part of the periodic re-issuance of the portable device 12. Receipt restoration is a function of the electronic receipt management policy defined by the electronic receipts administration system 24. Receipt restoration involves retrieving a duplicate or backup copy of the original electronic receipt, downloading the duplicate or backup copy to the portable device 12 and updating the duplicate or backup copy to be recognized as the master or original copy of the electronic receipt. Receipt restoration may occur at the user device 16 or the base device 14 and may require the devices 14 and 16 to connect to the electronic receipt management server 18 and/or the electronic receipts administration system 24 to obtain approval of the action. In addition, the electronic receipt management server 18 and the electronic receipts administration system 24 may cooperate with each other, such as exchanging requisite information, to provide receipt restoration. Restoration of an electronic receipt may be subject to the fulfillment of one or more management and/or access conditions, if any.

The electronic receipts administration system 24 is capable of performing a number of operations. For example, electronic receipts may be retrieved for information management by the service provider via the electronic receipts administration system 24. Information contained in the electronic receipts may be of value to the service provider not only at the point of sales but also in the context of certain back office operations. The service provider may via the electronic receipts administration system 24 upload copies of the electronic receipts stored in the base device 14 under its supervision and export the transaction information contained in these receipts for use by other systems or providers. For instance, information contained in an electronic receipt pertaining to a purchase may be used to resolve disputes about the transaction. Receipt exporting may also allow the service provider to extract performance statistics or usage information about the systems, including that which may be used to assess participation and billing to service providers or fraud detection and management.

In addition, the electronic receipts administration system 24 may also collect information from the base device 14 to facilitate base devices management. For example, statistics relating to transactions processed by the base device 14 may be used by the electronic administration system 24 to analyze performance of the base device 14 and allow the base device 14 to be managed more efficiently.

Receipt restoration can be an important component of customer service. Electronic receipt restoration can generate additional consumer benefits over paper receipts which can be easily lost or damaged. Receipt restoration means the user or the service provider is asked to identify a duplicate, not otherwise present in the portable device 12, and download such duplicate to the portable device 12. Receipt restoration may be subject to conditions contained in a receipt administration policy defined by the service provider. Such conditions may include notification to or authorization from the electronic receipts administration system 24.

The electronic receipts administration system 24 is capable of providing data and other requisite information to secure receipt generation and communications. The service provider via the electronic receipts administration system 24 is able to perform a number of functions including, for example, selecting, creating, distributing and maintaining the data required to secure the electronic receipts in the portable device 12 including generating and managing keys and security attributes, validating the integrity of the electronic receipts stored in the portable device 12, identifying participating portable devices when they interact with the base device 14, and securing communications between the portable device 12 and the base device 14, and between the base device 14 and the electronic receipts administration system 24.

The data and information needed to provide the foregoing functions are provided by the electronic receipts administration system 24 to the portable device 12, or the software agent residing on the portable device 12, at a minimum during its initialization, i.e., prior to its issuance and first use, and possibly from time to time after issuance, by execution of dedicated routines in the base device 14 or the user device 16. Such data and information are also loaded to the base device 14 at a minimum prior to its deployment and, from time to time, during its operation as the base device 14 connects with the electronic receipts administration system 24.

The service provider, using the electronic receipts administration system 24, is also able to define and distribute its receipt management policy. A receipt management policy may include requirements defined by the service provider to document transactions on electronic receipts. Receipt management policies include, for example, conditions associated with receipt manipulation operations, the transaction information to be included in an electronic receipt and administrative data, such as, validity period, that is to be used by the base device 14 to effectively generate, deliver and manage electronic receipts.

A copy of or changes to the receipt management policy may be downloaded from time to time from the electronic receipts administration system 24 to the base device 14 where the policy is stored and used by the base device 14 to generate, deliver and manage electronic receipts.

It should be understood that the present invention can be deployed in a variety of configurations. For example, in other alternative embodiments (not shown), the base device 14 can be configured to communicate with a number of different electronic receipts administration systems 24 corresponding to different service providers. The base device 14 is able to use different receipt generation and management policies from different service providers to generate and manage electronic receipts for transactions relating to different service providers. Furthermore, the base device 14 can be configured to communicate with a number of different portable devices 12 and generate electronic receipts therefor accordingly. Optionally, the base device 14 can be configured to handle transactions for some portable device 12 but not others. Similarly, the user device 16 can be configured to interact with a number of different portable devices 12 and allow receipt management to be performed with respect to some portable devices 12 but not others. Based on the disclosure and teachings provided herein, a person of ordinary skill in the art will appreciate other ways and/methods to deploy the present invention in various other configurations.

The present invention can be deployed in many different types of environments including, for example, environments (1) where a transaction between a service user and a service provider results in the production of a receipt used for information or subsequent transaction; (2) where the service user interacts with the service provider by means of a portable device interacting with a base device; (3) where the portable device may also be used to store payment account information used in the course of the transaction; (4) where the information relative to the receipt is generated at the point of sale or service in a substantially off-line manner, that is, where the base device does not generally have to retrieve information from a different remote system to complete the receipt creation; (5) where the information relative to the receipt is available in electronic form and such information may subsequently be displayed in printed form; (6) where receipts may be used in subsequent transactions, such as, the claim of a product or a service; (7) where the service users may wish to review and manage their receipts at will; and (8) where the information contained in the electronic receipts may be valuable to the service providers.

Electronic receipts generated by the system 10 as described above may be used in a number of illustrative situations. For example, (1) merchant receipts can be stored in the base device 14 at a store for various purposes, including but not limited to, regulatory compliance or proof of purchase; (2) claim tickets can be stored electronically as part of the electronic receipt in the portable device 12 when depositing a product for service (e.g., repair, cleaning, camera film development, etc.); (3) product and transaction information can be stored electronically as part of the electronic receipt in the portable device 12 for subsequent generation of warranty claims; (4) financial transaction information can be stored electronically as part of the electronic receipt for transactions completed at ATMs; (5) information relating to loyalty or rewards transactions can be stored electronically as part of the electronic receipt in the portable device 12; (6) information on transaction can be retrieved from the electronic receipt for various purposes, including but not limited to, expense reporting, tax reporting and personal finance management; (7) information can be retrieved from the electronic receipt for product exchange; (8) an electronic receipt can be transferred electronically, such as, via email, for various purposes, including for instance, a gift receipt needed for an exchange; (9) lost receipts can be restored; (10) important receipts can be kept in electronic escrow for safe protection; (11) other transaction examples include library card and book due date receipt, parking ticket, will-call ticket from web purchase of event tickets, coat claim check tickets, etc.; and (12) tickets generated at one merchant can be used at another merchant (e.g., proof of purchase).

Benefits envisioned from the present invention are several folds including, for example, (1) for participating operators of base devices, generating and storing electronic receipts in lieu of paper ones is a source of reduced operating costs; (2) for consumers, electronic receipts may reduce wallet clutter; (3) by allowing for the exporting of the information contained in electronic receipts, automation of a number of activities can be facilitated including warehousing of receipt for tax reporting purpose, expense reporting, and electronic warranty and product registration.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. An electronic receipt management server for managing electronic receipts, comprising:
   means for managing data representing at least one electronic receipt stored in a user device;
   means for communicating over a network with the user device; and
   means for storing the data representing the at least one electronic receipt, the data being supplied to the means for storing by the user device,
   wherein the data representing the at least one electronic receipt is created by an external device, which originally supplies the data to the user device, the external device being managed by a separate administration service provider,
   wherein the data stored by the means for storing is used for restoring the data to the user device or to a portable device, and
   wherein restoring the data requires communicating with the separate administration service provider over the network to obtain approval from the separate administration service provider to restore the data to the user device or to the portable device.

2. The electronic receipt management server of claim 1, wherein the means for communicating is secured according to a specification provided by the separate administration service provider.

3. The electronic receipt management server of claim 1, wherein restoring the data representing the at least one electronic receipt comprises retrieving a backup copy of the data representing the at least one electronic receipt from the means for storing the data representing the at least one electronic receipt and sending the backup copy of the data representing the at least one electronic receipt to the user device using the means for communicating.

4. The electronic receipt management server of claim 3, wherein restoring data representing the at least one electronic receipt further comprises updating the backup copy to be recognized as an original copy of the data representing the at least one electronic receipt.

5. The electronic receipt management server of claim 4, wherein restoring the data representing the at least one electronic receipt further comprises communicating with the separate administration service provider to exchange information related to restoring the lost data representing the at least one electronic receipt.

6. The electronic receipt management server of claim 5, wherein the information related to restoring the data representing the at least one electronic receipt comprises information regarding fulfillment of one or more access conditions.

7. The electronic receipt management server of claim 1, wherein the data is restored to the second user device, the portable device replacing the user device.

8. The electronic receipt management server of claim 1, wherein the separate administration service provider comprises a separate server.

9. A method for operating an electronic receipt management server for managing an electronic receipt, comprising:
   communicating with the user device over a network using the electronic receipt management server; and
   storing data representing at least one electronic receipt in the electronic receipt management server, the data received from the user device,
   wherein the data representing the at least one electronic receipt is originally supplied to the user device by an external device, which is managed by a separate administration service provider,
   wherein the data is used for restoring the data to the user device or to a portable device, and
   wherein restoring the data requires communicating with the separate administration service provider over the network to obtain approval from the separate administration service provider to restore the data to the user device or to the portable device.

10. The method of claim 9, wherein communicating with the user device is secured according to a specification provided by the separate administration service provider.

11. The method of claim 9, wherein restoring the data representing the at least one electronic receipt comprises retrieving a backup copy of the data representing the at least one electronic receipt from the electronic receipt management server and sending the backup copy of the data representing the at least one electronic receipt to the user device.

12. The method of claim 11, wherein restoring the data representing the at least one electronic receipt further comprises updating the backup copy of the data representing the at least one electronic receipt to be recognized as an original copy of the data representing the at least one electronic receipt.

13. The method of claim 12, wherein restoring the data representing the at least one electronic receipt further comprises communicating with the separate administration service provider to exchange information related to restoring the data representing the at least one electronic receipt.

14. The method of claim 13, wherein the information related to restoring the data representing the at least one electronic receipt comprises information regarding fulfillment of one or more access conditions.

15. The method of claim 9, wherein the data representing the at least one electronic receipt includes receipt status information, a unique receipt identifier, transaction identifying information, base device information, and portable electronic device identification information.

16. The method of claim 15, wherein the receipt status information identifies the data representing the at least one electronic receipt as being one of: original, duplicated, invalid, or deleted.

17. The method of claim 15, wherein the transaction identifying information includes a transaction ID, transaction date, transaction amount, information on products or service delivered, and a receipt validity period.

18. The method of claim 9, wherein the data is restored to the second user device, the portable device replacing the user device.

19. The method of claim 9, wherein the separate administration service provider comprises a separate server.

* * * * *